United States Patent
Puentes-Barr

(10) Patent No.: US 7,328,670 B2
(45) Date of Patent: Feb. 12, 2008

(54) APPARATUS FOR DISPENSING POURABLE MATERIAL TO AN OUTER SURFACE OF A VESSEL

(76) Inventor: Maria Puentes-Barr, 122 Norfolk Rd., Livermore, CA (US) 94551

( * ) Notice: Subject to any disclaimer, the term of this patent is extended or adjusted under 35 U.S.C. 154(b) by 245 days.

(21) Appl. No.: 11/173,460

(22) Filed: Jun. 30, 2005

(65) Prior Publication Data

US 2007/0000440 A1    Jan. 4, 2007

(51) Int. Cl.
B05C 19/06 (2006.01)
B05C 17/005 (2006.01)

(52) U.S. Cl. .................. 118/13; 118/308; 222/501; 222/518; 141/351; 141/365; 141/367; 141/368; 99/494

(58) Field of Classification Search ............... 118/13, 118/308; 222/313, 225, 407, 448, 518, 181.2, 222/501; 141/351, 353, 357, 365, 367, 368, 141/388, 362, 335, 20, 20.5, 2; 401/264; 99/494; 426/289; 220/501, 507; 206/217, 206/219; 427/180, 284, 287
See application file for complete search history.

(56) References Cited

U.S. PATENT DOCUMENTS

| | | | | |
|---|---|---|---|---|
| 1,956,209 A | * | 4/1934 | Booth | 215/328 |
| 2,199,947 A | * | 5/1940 | Benofsky et al. | 222/501 |
| 3,042,085 A | * | 7/1962 | Morris | 141/353 |
| 3,091,374 A | * | 5/1963 | Schwartzman | 222/448 |

\* cited by examiner

*Primary Examiner*—Laura Edwards
(74) *Attorney, Agent, or Firm*—Foothill Law Group, LLP; Barton A. Smith

(57) ABSTRACT

A dispenser delivers a pourable material onto the outside of a receiving vessel, for example, a flavorant like granular salt or sugar onto the rim of a beer bottle or margarita glass, or a glue, sealant, or lubricant onto the external threads of a chemical bottle. An external casing containing the pourable material has an opening at the bottom that is normally sealed by a retractable encloser held in place by a closer spring inside the casing. To dispense pourable material, the bottom of the encloser is pressed against the rim of the receiving vessel, lifting the encloser from its normally-closed position and opening an annular path through which the material is released onto the outside of the rim, but not into the interior, of the receiving vessel.

17 Claims, 3 Drawing Sheets

APPARATUS FOR DISPENSING POURABLE MATERIAL TO AN OUTER SURFACE OF A VESSEL

BACKGROUND OF THE INVENTION

The field of the invention is dispensers, specifically dispensers that provide a controlled flow of a pourable material.

It is sometimes desirable to deliver a controlled flow of a pourable material to the outer rim, but not to the interior, of a receiving vessel. For example, when applying a flavorant such as salt or sugar to the rim of a beer bottle or a margarita glass, the object is to obtain a relatively even coating of the flavorant on the (pre-moistened) outer rim of the bottle or glass, to come in contact with the lips of a drinker of the beverage, but to avoid insertion of the applied material into the interior of the bottle or glass, where it may cause undesirable frothing or excessive flavoring of the beverage inside. Other applications, such as applying glue or sealant to an outer rim, including to an externally threaded closure, of a vessel whose interior must be kept free of the applied material, present a similar problem.

What is needed is an apparatus capable of dispensing a pourable material onto the outer rim or lip and exterior surface of a receiving vessel, while preventing the applied material from entering the interior of the vessel.

BRIEF SUMMARY OF THE INVENTION

The dispenser uses an external casing to hold some pourable material, for example some flavorant such as granular salt or sugar, or some glue, or sealant, or lubricant. The casing incorporates a bottom opening, normally closed off by a retractable encloser having a peripheral sealing edge that contacts the casing's interior, containing the pourable material. The sizes of the opening and encloser are closely matched to the diameter of an outer rim or lip of a receiving vessel onto which the pourable material is to be dispensed, for example a beer bottle or margarita glass, or a chemical or pharmaceutical bottle. When it is desired to dispense the pourable material onto the rim of the receiving vessel, the encloser is retracted into the casing, creating an annular opening around the encloser, through which the pourable material is released. The encloser is retracted by pressing the bottom of the encloser against a top of the rim of the receiving vessel. The pourable material is thereby dispensed onto the rim and exterior of the receiving vessel, but not into the vessel's interior. The interior can be further sealed against entry of the pourable material, and the dispenser centered above the receiving vessel, by adding to a bottom surface of the encloser a slightly tapered plug matched to the inside diameter of the vessel's rim, which plug fits inside the rim.

DETAILED DESCRIPTION OF THE INVENTION

In some applications, it is desirable to be able to selectively apply a quantity of a pourable material to an external surface of a receiving vessel, especially at or near the lip or rim, neck, or entrance of the vessel, but without allowing any of the pourable material to reach the interior of the vessel. A typical application is depositing a layer of salt, sugar, or other condiment or flavorant upon the rim of a beverage bottle or of a glass. In this application, where the material to be deposited is a solid powdered or granular material, the user pre-moistens the outside of the rim of the vessel to cause the material to adhere to it. Another typical application is applying a layer of pourable glue, sealant, lubricant, or the like to the rim and external neck of a bottle or other vessel, without any of the material entering the vessel. (Note that, for purposes of this application, which covers dispensers suitable for use on various receiving vessels, such as bottles, jars, and glasses, the terms "lip" and "rim" are used interchangeably for the entrance to the receiving vessel, though most commonly an externally-ridged opening of a vessel like a beer bottle would be called a lip, and an externally smooth-walled opening of a vessel like a margarita glass a rim.)

The dispenser comprises a casing with an opening at a bottom end, and an encloser that seals off the opening, to contain the pourable material. In use, the encloser is caused to move out of contact with the casing, opening an annular path for the material within to be released onto the rim and external surface of the vessel.

Figure 1:
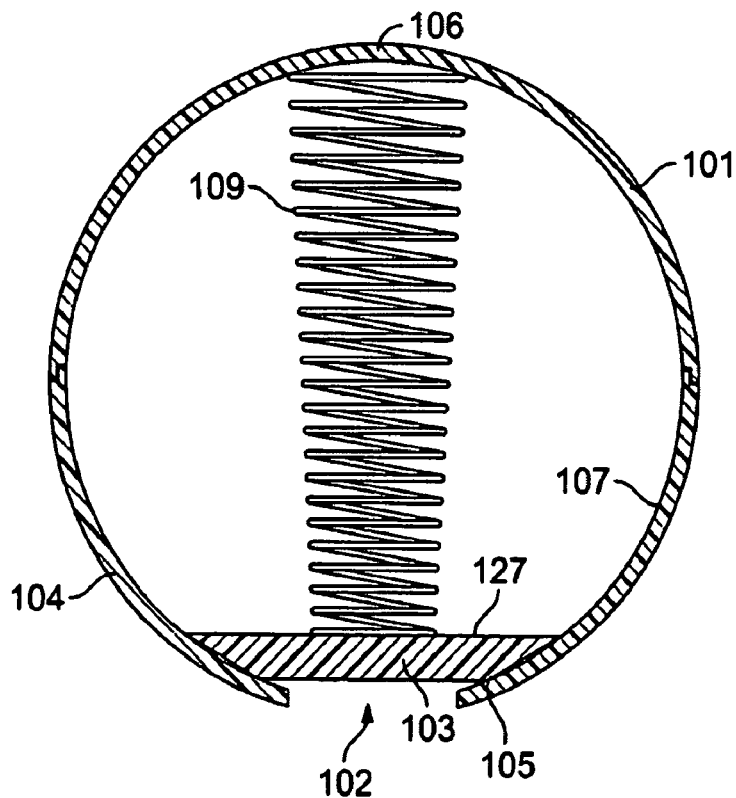
FIG. 1 shows a cross-sectional view of one embodiment of the apparatus, with an encloser in a normally-closed (non-dispensing) position.

As stated in the Brief Description of the Several Views of the Drawing FIG. 1 shows a cross-sectional view of one embodiment of the apparatus, with an encloser in a normally-closed (non-dispensing) position. Shown on FIG. 1 are a casing 101, a closed top section 106, an inwardly curving bottom section 104, an opening 102, an encloser 103, a closing spring 109, an encloser top surface 127, an encloser peripheral sealing edge 105, and a casing interior surface 107.

FIG. 1 illustrates one advantageous embodiment of the dispenser. The casing 101 has a closed top section 106 and an inwardly curving bottom section 104 with an opening 102, covered by an encloser 103. The encloser is held in place in a normally-closed position, sealing off the opening against the flow of pourable material, by the force of the compressed closing spring 109 against the top surface 127 of the encloser. The closing spring presses the encloser's peripheral sealing edge 105 tightly against the interior surface 107 of the casing's bottom section. Securing a top end of the closing spring to the top of the casing 106 and a bottom end of the closing spring to the top surface of the encloser prevents axial shifting of the closing spring and encloser with respect to the opening at the bottom of the casing during use of the dispenser. Fabrication of the dispenser is most conveniently accomplished if the casing is split peripherally into an upper and a lower section, and those two sections are fastened together in some way, e.g., snapped, glued, or screwed together, after insertion of the encloser and the closing spring into the interior of the casing. Note that, for convenience, the hatching of the cross-sections of various features of the dispenser on this and other figures corresponds to a material of construction of synthetic resin or plastic. As discussed elsewhere in the Specification, other materials of construction are contemplated as well.

Note: The first digit of each number assigned to an identified feature on one of the several figures is the number of the figure upon which it appears, so that identification numbers staring with 1 are found on FIG. 1, those starting with 2 on FIG. 2, and so on. Where there are functionally corresponding features shown on multiple drawings, their identifications share the last two digits, e.g., an encloser, 103, 203, 303, 403, 503, and 603.

Figure 2:
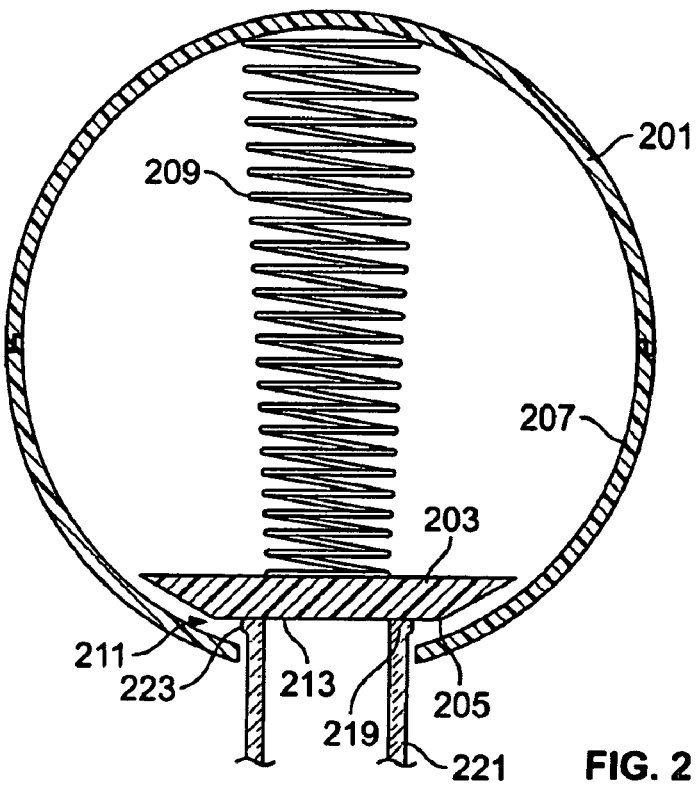
FIG. 2 shows a cross-sectional view of the embodiment shown in FIG. 1, with the encloser in an open (dispensing) position over a narrow receiving vessel.

As stated in the Brief Description of the Several Views of the Drawing, FIG. 2 shows a cross-sectional view of the embodiment shown in FIG. 1, with the encloser in an open (dispensing) position over a narrow receiving vessel. Shown in FIG. 2 are an encloser 203, with a bottom surface 213 and a peripheral sealing edge 205, a receiving vessel 221 with a lip 219, having an outside surface 223, a closing spring 209, a casing 201 with an interior surface 207, and an annular space 211 between the casing and the encloser's peripheral sealing edge, FIG. 2 shows the same embodiment as FIG. 1, but in an open (dispensing) position. The bottom surface 213 of the encloser 203 has been pressed down against the lip 219 of the receiving vessel 221, onto which the pourable material is to be dispensed, compressing the closing spring 209. As a result, the encloser 203 retracts slightly into the casing 201, causing the casing's peripheral sealing edge 205 to move out of contact with the interior surface 207 of the casing, opening the annular space 211 through which the material to be dispensed is now free to flow onto the outside surface 223 of the lip of the receiving vessel. At the same time, the bottom surface 213 of the encloser contacts and seals off the lip of the receiving vessel, preventing entry of the dispensed material into the interior of the vessel.

Figure 3:
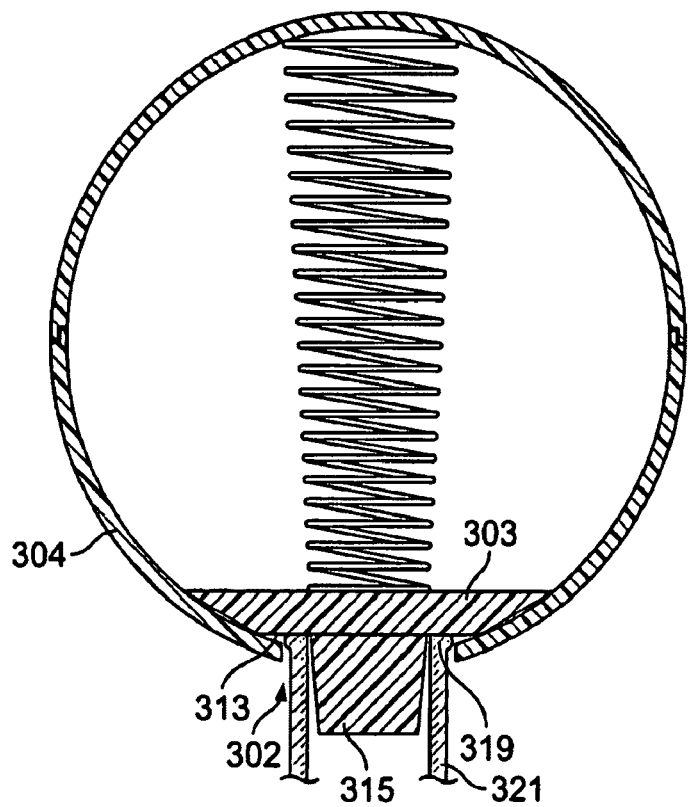
FIG. 3 shows a cross-sectional view of another embodiment, with an encloser that incorporates a blocking plug, closing off the rim of a narrow receiving vessel.

FIG. 3 shows a cross-sectional view of another embodiment, with an encloser that incorporates a blocking plug, closing off the rim of a narrow receiving vessel.

Shown in FIG. 3 are an encloser 303, with a blocking plug 315 on a bottom surface of the encloser, and a lip 319 of a receiving vessel 321.

In another embodiment, illustrated in FIG. 3, the encloser 303 incorporates on its bottom surface 313 the, slightly tapered, central blocking plug 315, closely matched in its maximum outside diameter to the inside diameter of the vessel lip 319. When the encloser is pressed downward against the lip 319 of a suitable sized receiving vessel 321, with the blocking plug inside the lip, the blocking plug centers the encloser and the entire dispenser over the receiving vessel, and also more completely seals off the lip of the receiving vessel against insertion of the dispensed material into the inside of the vessel.

Figure 4:
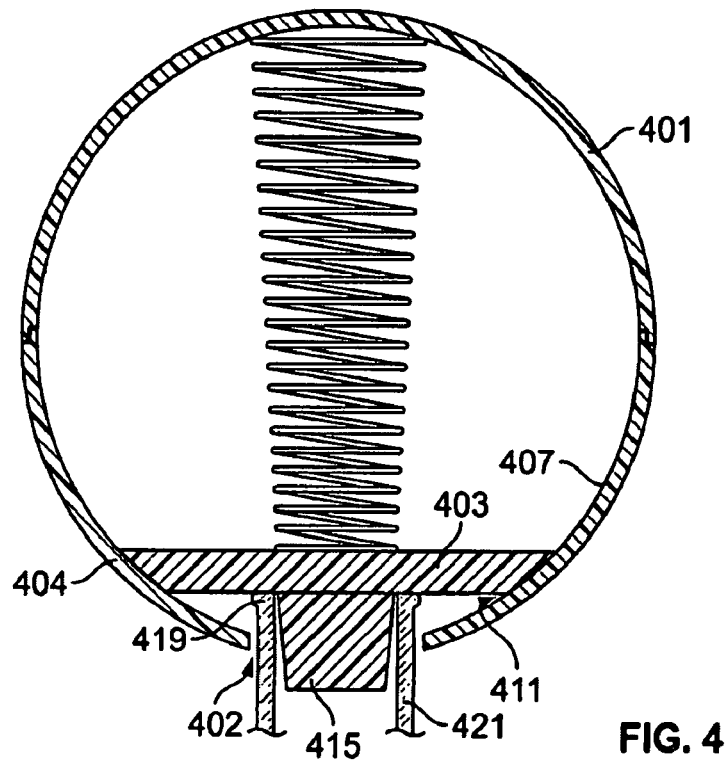
FIG. 4 shows a cross-sectional view of another embodiment, with an inwardly curved casing to direct dispensed material inward.

As stated in the Brief Description of the Several Views of the Drawing, FIG. 4 shows a cross-sectional view of another embodiment, with an inwardly curved casing to direct dispensed material inward. Shown on FIG. 4 are a casing 401 with a bottom section 404 and an interior surface 407, an encloser 403 with a blocking plug 415, an annular space 411 between the casing and the encloser, and a receiving vessel 421 with a rim 419.

In another advantageous embodiment, illustrated in FIG. 4, the casing's 401 bottom section 404 continues curving inward below the level of the encloser 403 at its normally-closed position contacting the interior 407 of the casing. When the annular space 411 is opened by raising the encloser by pressing it downward against the rim 419 of the receiving vessel 421, the flow of the pourable material being dispensed is directed inward, against the outside of the rim, so that more of the material adheres to the vessel. This is especially advantageous when used in conjunction with the blocking plug 415 from the previously discussed embodiment, also shown as 315 in FIG. 3.

In a particularly advantageous embodiment, also illustrated in FIGS. 2, 3, and 4, the diameters of the openings 202, 302, and 402, respectively, in the bottom of the casings, and the enclosers 203, 303, and 403, respectively, are adapted for a compatible fit with the rim of a standard commercial beer bottle, so as to dispense, for example, salt, sugar, chili powder, or other granular or powdered flavorant onto the beer bottle's rim, which has been pre-moistened to cause the flavorant to adhere to the rim, without the flavorant entering the interior of the bottle.

Figure 5:
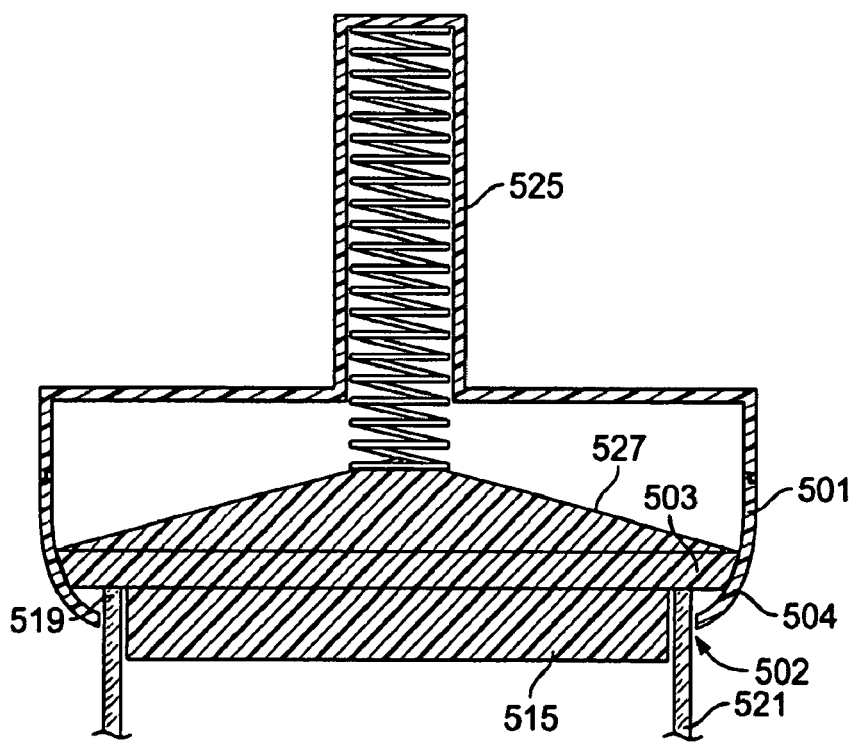
FIG. 5 shows a cross-sectional view of another embodiment, adapted to fit a larger diameter receiving vessel.

As stated in the Brief Description of the Several Views of the Drawing, FIG. 5 shows a cross-sectional view of another embodiment, adapted to fit a larger diameter receiving vessel. Shown on FIG. 5 are a casing 501 with an inwardly curving bottom section 504 having an opening 502, an encloser 503 with a blocking plug 515 and a top surface 527, an upper body 525 of the casing, and a receiving vessel 521 with a rim 519.

In another advantageous embodiment, illustrated in FIG. 5, the diameter of the casing's 501 inwardly curving bottom section 504, its opening 502, and the encloser 503 are all adapted to fit over the lip of a specific diameter receiving vessel other than a bottle, such as but not limited to a margarita glass, and to similarly deliver a coating of pourable powdered or granular flavorant to the rim of the glass, but prevent its entry into the interior of the glass. Note that FIG. 5 also illustrates an embodiment in which the encloser incorporates a larger version of the blocking plug 515, to further prevent entry of the material into the interior of the glass. Note that, while it is necessary that the diameters of the opening, encloser, and, where present, the blocking plug be large enough to fit over the larger receiving vessel rim 519, the upper body 525 of the dispenser can be of any convenient diameter and height. One advantageous embodiment, illustrated in FIG. 5, incorporates an upper body of the dispenser that is significantly smaller than that of the rim 519 of the receiving vessel 521. This permits the dispenser to be filled with a smaller volume of the pourable flavorant, and also provides a convenient vertical gripping section for the dispenser.

In any of the embodiments, but especially in those wherein the diameters of the encloser and the opening are significantly larger than that of the upper body of the casing, it is advantageous, as also illustrated in FIG. 5, to have the top surface 527 of the encloser take the form of a right circular cone, having a slope that exceeds the angle of repose of the pourable granular or powdered material being dispensed. In this way, the material flows down to the outer diameter of the encloser, and thence out of the dispenser, when the encloser is in its open position, even when the dispenser's casing is nearly empty of the material.

Where the dispenser is intended to be essentially disposable, as in applications where, for example, a bar patron would be given or sold his or her own dispenser to use for the visit and then throw away or take home, an inexpensive set of embodiments is desirable, wherein the casing and the encloser are made of a rigid plastic. As a marketing bonus, the plastic casing can also take the shape and color of, say, a lemon or a lime, and can have advertising printed on it, for example the name of the bar, the name of a beverage manufacturer or product, the name of a sports team, etc.

On the other hand, where the dispenser is intended to be retained and reused over a considerable period (for example, for use in a home, bar, or restaurant as permanent "barware," intended to be sterilized after each guest's use for use by another; or for use in applying glues, sealants, or lubricants in an industrial setting), a more robust construction is preferred. Accordingly, a second set of embodiments has the casing fabricated of any suitable metal, including, without limitation, any of stainless steel, chromed steel, aluminum, brass, chromed brass, and titanium.

Figure 6:
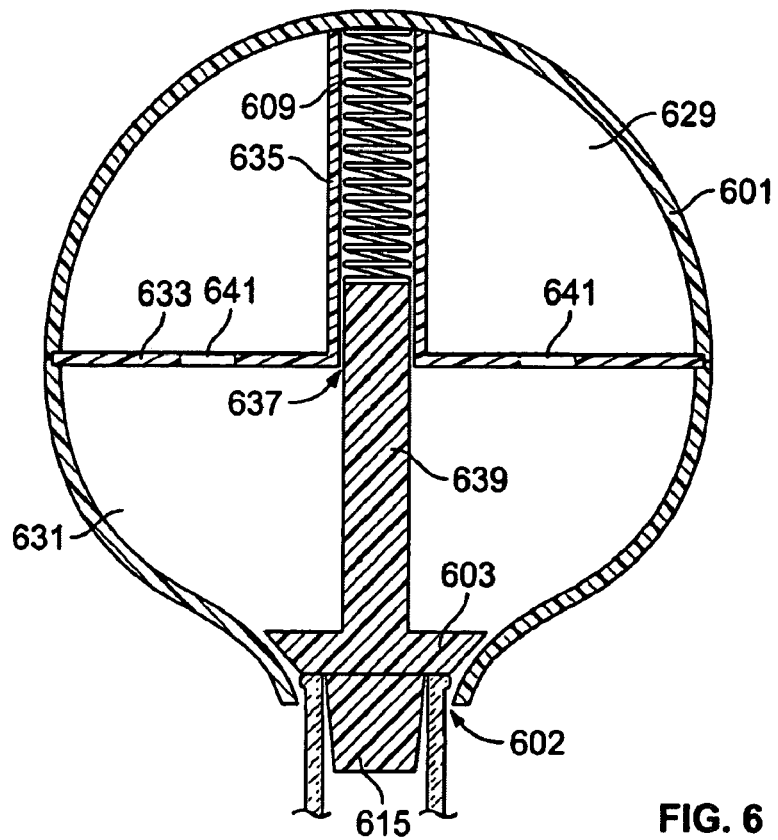
FIG. 6 shows a cross-sectional view of another embodiment, with a casing separated into two chambers by a separator plate, and a shaft arrangement to guide movement of an encloser.

As stated in the Brief Description of the Several Views of the Drawing, FIG. 6 shows a cross-sectional view of another embodiment, with a casing separated into two chambers by a separator plate, and a shaft arrangement to guide movement of an encloser. Shown on FIG. 6 are a casing 601 with an upper chamber 629, a lower chamber 631 with an opening 602, an encloser 603 with a vertical encloser shaft 639 and a blocking plug 615, a separator plate 633 with an encloser shaft opening 637 and one or more flow openings 641, a vertical hollow shaft 635, and a closing spring 609.

Another advantageous embodiment, illustrated in FIG. 6, has the casing 601 divided into the upper chamber 629 and the lower chamber 631, with the opening 602 at the bottom of the lower chamber, the chambers separated from each other by a separator plate 633, with a vertical hollow shaft 635 reaching from the separator plate to the top of the casing, and a central encloser shaft opening 637 pierced through the separator plate inside the vertical hollow shaft. A vertical encloser shaft 639 is mounted atop the encloser 603, and compresses the closing spring 609 inside the vertical hollow shaft when the encloser 603 is raised from the casing opening 602 in dispensing the pourable material. This hollow shaft arrangement both restrains the closing spring from buckling during dispensing of pourable material, and prevents granular pourable material being dispensed from impeding the smooth movement of the encloser shaft and, especially, the compression of the closing spring, during dispensing. The separator plate is also pierced through with one or more flow openings 641 to permit flow of the pourable material from the upper chamber into the lower chamber. In a particular embodiment, also illustrated in FIG. 6, the casing opening, the encloser, and the encloser blocking plug 615 are all adapted for a compatible fit to the rim of a standard beer bottle. In another embodiment, the casing opening, encloser, and encloser blocking plug are all adapted for a compatible fit to the rim of a specific desired beverage glass. In one embodiment particularly advantageous as a low-cost, essentially disposable, dispenser, the casing, the encloser, including its encloser shaft, the separator plate, and the hollow vertical shaft, are all fabricated of plastic. Selection of a clear or translucent plastic material permits the user to visually check the level of salt or other pourable material in the dispenser. In an embodiment particularly advantageous from a manufacturing standpoint, the hollow vertical shaft 635 is an integral part of the separator plate. In another advantageous embodiment, the hollow vertical shaft is an integral part of the top of the casing.

In embodiments adapted for dispensing granular or powdered materials, the encloser is conveniently fabricated of a moderately hard plastic material. Here, again, selection of a transparent or translucent plastic material permits the user to check the level of pourable material in the dispenser, even where the casing is fabricated of an opaque material.

In embodiments adapted for dispensing liquid materials, a more positive seal is required, and the encloser is conveniently fabricated of a suitable hard material, including any of the plastics or metals used for the casing, with an elastomeric material affixed as the encloser's peripheral sealing edge, in contact with the interior of the casing in the encloser's normally-closed position.

While the invention has been described in relation to the embodiments shown in the accompanying Drawing figures, other embodiments, alternatives, and modifications will be apparent to those skilled in the art. It is intended that the Specification be exemplary only, and the true scope and spirit of the invention be indicated by the following Claims.

What is claimed is:

1. A dispenser for delivering a controlled amount of a pourable material onto a rim of a receiving vessel, comprising:
   a. a casing to contain a pourable material, the casing having a closed top end and a bottom end with an opening adapted in size to fit closely over the rim of the receiving vessel onto which the pourable material is to be delivered;
   b. an encloser covering and sealing the opening at the bottom of the casing when the encloser is in a normally-closed position, the encloser having a top surface, a bottom surface shaped so as to lie flat atop the rim of the receiving vessel, and a peripheral sealing edge that sits in contact with the casing, preventing escape of the pourable material from the casing;
   c. a closing spring, located inside the casing and extending from the closed top end of the casing to the top surface of the encloser, the closing spring being compressed to apply a downward force to hold the encloser in the normally-closed position, the closing spring being further compressed by pressing the bottom surface of the encloser downward against the rim of the receiving vessel, to open an annular space for flow of the pourable material from the casing onto the rim of the receiving vessel, and to block flow of the pourable material into the interior of the receiving vessel; and,
   d. on the bottom surface of the encloser, a blocking plug, tapered from a diameter approximately equal to an inside diameter of a lip of the receiving vessel at the plug's point of joining to the encloser, to a slightly smaller diameter at the plug's bottom, whereby, when the plug is inserted into the receiving vessel and the encloser pressed down against the vessel's lip to dispense the material, the dispenser is centered above the receiving vessel, and the path to the interior of the receiving vessel is further sealed off against flow of the material.

2. The dispenser of claim 1, further comprising
   a. the encloser further having on its upper surface a vertical encloser shaft extending upward, the top of which shaft compresses the closing spring when the encloser is moved upward to dispense the pourable material;
   b. a horizontal separator plate, dividing the casing into an upper chamber and a lower chamber, the plate pierced though at its center by an encloser shaft opening through which the encloser shaft passes when the encloser is lifted to dispense the pourable material, the plate also being pierced through with one or more flow openings to permit flow of the pourable material from the upper chamber into the lower chamber; and c. a hollow vertical shaft surrounding the encloser shaft opening of the separator plate and extending upward from the separator plate to the top of the casing, in which hollow vertical shaft the encloser shaft compresses the closing spring during dispensing of the pourable material.

3. The dispenser of claim 2, wherein the opening in the bottom of the casing and the diameter of the blocking plug are adapted for a compatible fit to the rim of a standard beer bottle.

4. The dispenser of claim 2, wherein the opening in the casing is adapted for a compatible fit to the rim of a specific desired beverage glass.

5. The dispenser of claim 2, wherein the casing, the encloser, the encloser shaft, the separator plate, and the hollow vertical shaft are all fabricated of plastic.

6. The dispenser of claim 5, wherein the hollow vertical shaft is an integral part of the separator plate.

7. The dispenser of claim 5, wherein the hollow vertical shaft is an integral part of the casing.

8. The dispenser of claim 5, wherein the plastic of which the dispenser is fabricated is sufficiently transparent to permit viewing the level of pourable material present in the casing.

9. The dispenser of claim 2, wherein the casing is fabricated of metal.

10. The dispenser of claim 1, adapted to dispensing granular materials, wherein the casing curves inward beneath the peripheral sealing edge of the encloser when the encloser is in its normally-closed position, whereby the encloser is enabled to seal off against the flow of the pourable material from the casing when in its normally-closed position, and whereby, when dispensing the material, the released material strikes the inward-curving casing and is directed inward toward the outside of the rim of the receiving vessel.

11. The dispenser of claim 10, wherein the opening in the bottom of the casing is adapted for a compatible fit to the rim of a standard beer bottle.

12. The dispenser of claim 10, wherein the opening in the casing is adapted for a compatible fit to the rim of a specific desired beverage glass.

13. The dispenser of claim 1, wherein the opening in the bottom of the casing and the diameter of the blocking plug are adapted for a compatible fit to the rim of a standard beer bottle.

14. The dispenser of claim 1, wherein the opening in the bottom of the casing and the diameter of the encloser blocking plug are adapted for a compatible fit to the rim of a specific desired beverage glass.

15. The dispenser of claim 14, wherein the top surface of the encloser is a right circular cone, having its apex pointing upward, and further having a slope steeper than an angle of repose of the pourable material in the casing, whereby such material is directed to the peripheral sealing edge of the encloser.

16. The dispenser of claim 1, wherein the casing is fabricated of plastic.

17. The dispenser of claim 1, wherein the casing is fabricated of metal.

* * * * *